United States Patent [19]

Robin et al.

[11] Patent Number: 4,794,045
[45] Date of Patent: Dec. 27, 1988

[54] LANGMUIR-BLODGETT FILMS USABLE IN NONLINEAR OPTICS

[75] Inventors: Philippe Robin, Le Plessis Robinson; Evelyne Chastaing, Massy; Jean P. Pocholle, Arpajon; Jean Raffy, Crosne, all of France

[73] Assignee: Thomson-CSF, Paris, France

[21] Appl. No.: 141,503

[22] Filed: Jan. 7, 1988

[30] Foreign Application Priority Data

Jan. 9, 1987 [FR] France ................... 87 00164

[51] Int. Cl.$^4$ ................... B05D 1/20
[52] U.S. Cl. ................... 428/411.1; 427/434.3; 350/96.34; 350/96.12
[58] Field of Search ................... 428/411.1; 350/96.34, 350/96.12; 427/434.3

[56] References Cited

U.S. PATENT DOCUMENTS

| | | | |
|---|---|---|---|
| 4,431,263 | 2/1984 | Garito | 350/96.34 |
| 4,515,429 | 5/1985 | Smith et al. | 350/96.34 |
| 4,531,809 | 7/1985 | Carter et al. | 350/96.12 |
| 4,536,450 | 8/1985 | Garit | 350/96.34 |
| 4,645,693 | 2/1987 | Roberts | 427/434.3 |
| 4,647,518 | 3/1987 | Matsuda | 430/21 |
| 4,728,576 | 3/1988 | Gillberg-LaForce | 350/96.34 |

OTHER PUBLICATIONS

French Search Report—FR 87 00 164, Feb. 10, 1987.
ISAF '86, Proceedings of the Sixth IEEE International Symposium on Applications of Ferroelectrics, 1986, pp. 89-92, IEEE, New York, U.S.; D. B. Neal et al.: "Langmuir-Blodgett Films for Nonlinear Optics".

Primary Examiner—Edith Buffalow
Attorney, Agent, or Firm—Oblon, Fisher, Spivak, McClelland & Maier

[57] ABSTRACT

A Langmuir-Blodgett film comprises at least one layer of amphiphilic molecules which are of two different types. The first type comprises molecules that are active in nonlinear optics. The second type consists of molecules that are inert or active in nonlinear optics. The mixture of these two types of molecules, in specified proportions, gives a film capable of radiating, perpendicular to the substrate, an optic wave which is a second harmonic with reference to an exciting wave.

6 Claims, 3 Drawing Sheets

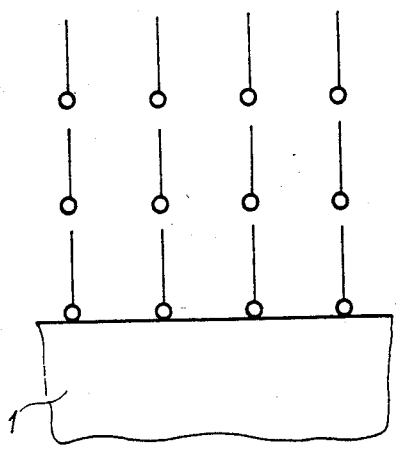
FIG_1
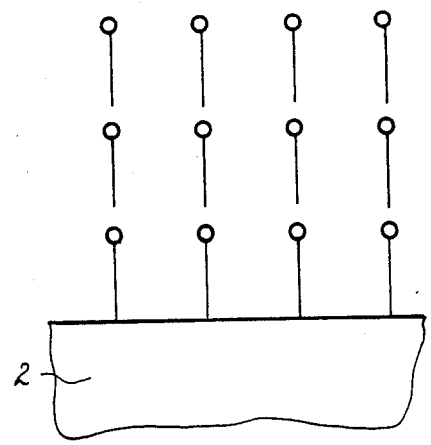
FIG_2
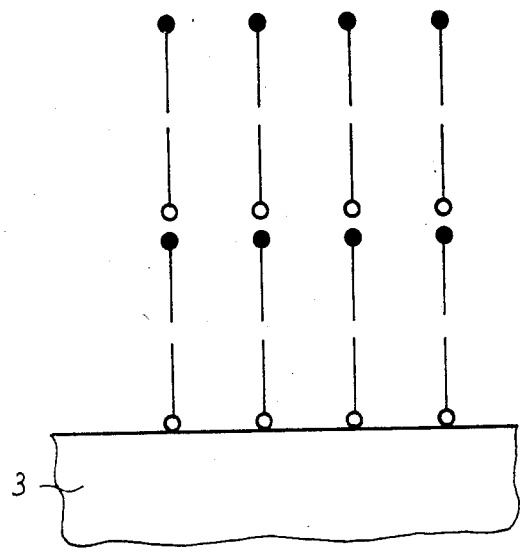
FIG_3

FIG_4
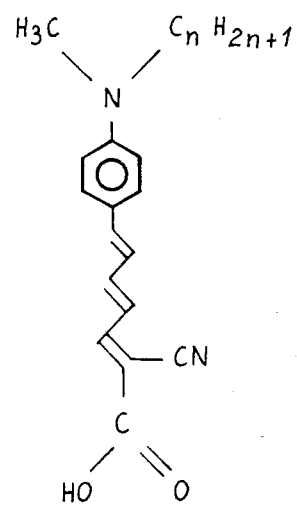
FIG_5
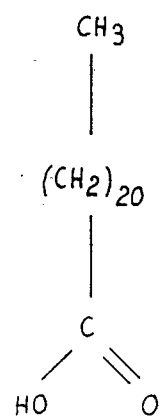

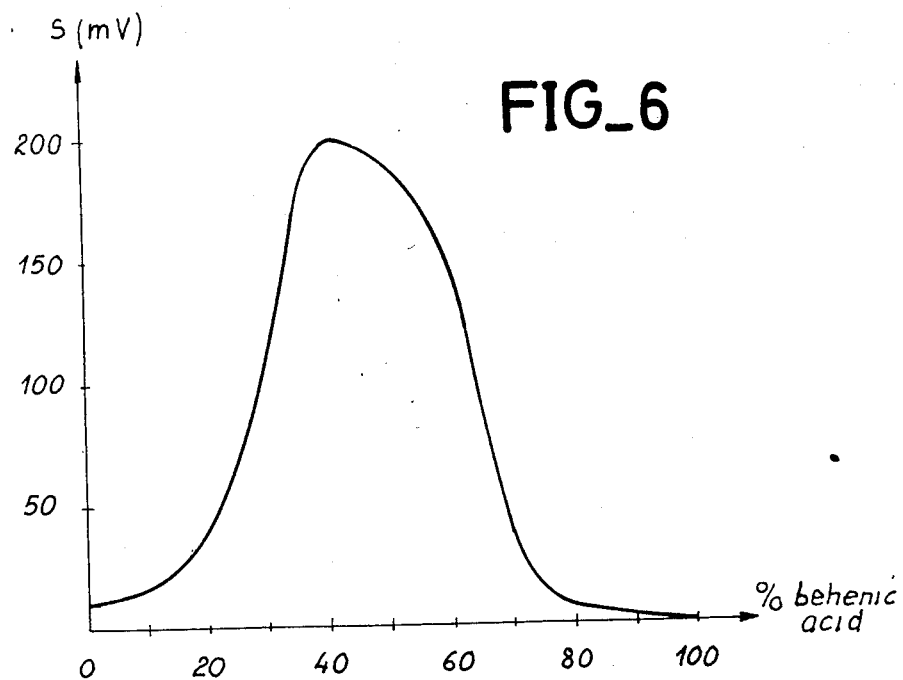
FIG_6
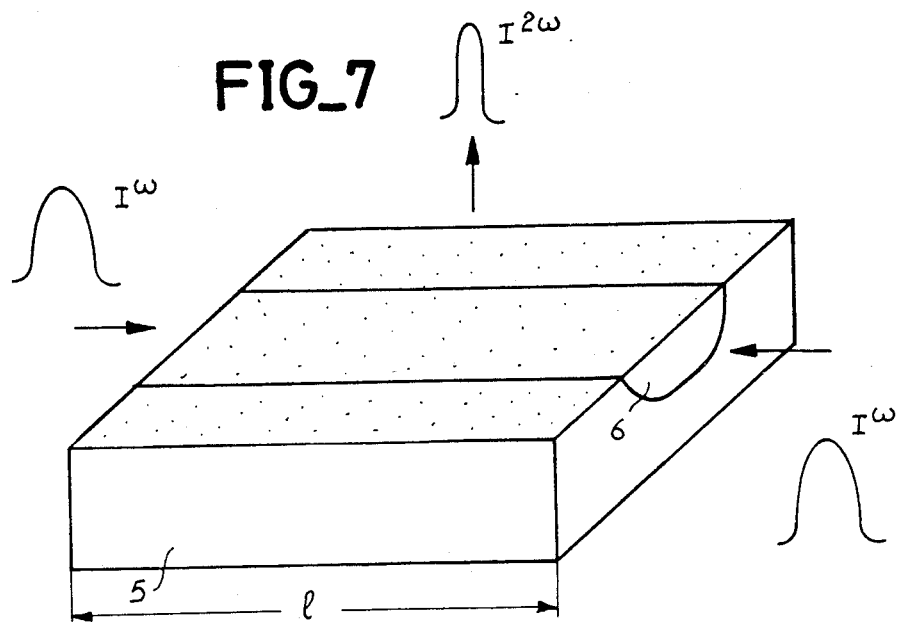
FIG_7

LANGMUIR-BLODGETT FILMS USABLE IN NONLINEAR OPTICS

BACKGROUND OF THE INVENTION

1. Field of the Invention

The present invention pertains to Langmuir-Blodgett films and more particularly to those capable of being applied in nonlinear optics.

The Langmuir-Blodgett method makes it possible to obtain very thin (10 to 40 angstroms) organized monolayers on the surface of a liquid, to transfer these monolayers and to superimpose them on a substrate. The possibilities for the application of these films are derived from the following characteristics: the simplicity of the preparation method, high precision of thicknesses obtained (a few angstroms), the orientation of the molecules and adjustable physical properties.

2. Description of the Prior Art

In nonlinear optics, the physical property that is sought to be used is a second order or third order nonlinear optical susceptibility. Thus, for the generation of second harmonic waves, the useful Langmuir-Blodgett films are those having a non-centrosymmetrical structure. Structures of this type are already known in the prior art. They are classified according to the orientation imposed on the molecules of the different monolayers that form the films. It is thus possible to prepare films formed of X type or Z type layers, i.e. where all the molecules are placed in the same direction. It is also possible to make films formed of A, B, A, B type layers, i.e. where some layers are formed of A molecules and others are formed of B molecules, with the various layers alternating. The noteworthy fact about these structures is that they result in films for which the axis of maximum hyperpolarizability is perpendicular to the substrate. The result of this is that a light wave arriving in a direction perpendicular to the substrate (the associated electrical field being therefore parallel to the substrate) has no interaction with these films. For example, in one experiment for the generation of second harmonics, the amplitude of the wave generated at $2\omega$ in a direction perpendicular to the plane of the substrate is nil. Now, in many applications of these Langmuir-Blodgett films, it is necessary to obtain the generation of the second harmonic in a direction perpendicular to the substrate.

To remove these disadvantages, the present invention proposes films, prepared by the Langmuir-Blodgett method, comprising at least one layer of a mixture of molecules, the mixture being chosen so as to obtain the desired properties. In mixing molecules of different natures, it becomes possible for these molecules to adopt a configuration and arrangement different from those they would have had if used alone.

SUMMARY OF THE INVENTION

An object of the invention therefore, is a Langmuir-Blodgett film comprising at least one layer of amphiphilic molecules deposited on a substrate, wherein these molecules are of at least two different types, a first type of molecules being active in nonlinear optics and a second type of molecules being capable of remaining inert or being active in nonlinear optics, these two types of molecules being mixed in specified proportions to obtain a film capable of sending out, perpendicular to the substrate, an optic wave which is a second harmonic with respect to an exciting wave.

BRIEF DESCRIPTION OF THE DRAWINGS

The invention will be better understood and its other advantages will emerge from the following description, given as a non-exhaustive example, and the appended drawings, of which:

FIGS. 1 to 3 are schematic views of Langmuir-Blodgett film structures according to the prior art, FIGS. 4 to 5 represent molecules that can be used to make films according to the invention, FIG. 6 is a graph representing the value of a second harmonic generating signal as a function of the composition of a film according to the invention, FIG. 7 illustrates an example of the application of films according to the invention.

DESCRIPTION OF PREFERRED EMBODIMENTS

Langmuir-Blodgett films are obtained from amphiphilic molecules. These molecules are elongated and have a hydrophilic group at one end and a hydrophobic group at their other end. The simplest amphiphilic molecules are the fatty acids $CH_3-(CH_2)_n-COOH$ which consist of a hydrophilic polar head $-COOH$ and a hydrophobic aliphatic chain $CH_3-(CH_2)_n-$. Behenic acid $CH_3-(CH_2)_{20}-COOH$ is one of the most frequently used molecules.

Films possessing a non-centrosymmetrical structure, according to the prior art, are shown in FIGS. 1 to 3. In these figures, the amphiphilic molecules are shown in the form of pins, the heads of which represent the hydrophilic side of the molecule. FIG. 1 represents a Z type film comprising three layers of molecules deposited on a substrate 1. FIG. 2 represents an X type film comprising three layers of molecules deposited on a substrate 2. FIG. 3 represents a film possessing an A, B, A, B structure comprising four layers of molecules deposited on a substrate 3. These molecules are of two different types: molecules A shown with blank hydrophilic heads and molecules B shown with black hydrophilic heads. It is thus possible to form alternate layers as shown in FIG. 3.

Since these prior art films do not enable the generation of a second harmonic in a direction perpendicular to the substrate, the invention proposes a special structure. The film, according to the invention may comprise only one layer of molecules deposited on a substrate, but it may also comprise several of these layers. Each layer is made up of a mixture of amphiphilic molecules of at least two different types. The arrangement of the molecules with respect to one another has not been been the subject of special study. It is the properties of these molecules that have been used in the present invention. The relative proportions of the various molecules may be calculated so that the film has maximum effectiveness when used.

In the following part of the description, we shall describe the obtaining of a film according to the invention. The starting products comprise A molecules which are active in nonlinear optics and B molecules which may or may not be inert. These two types of molecules should be amphiphilic molecules to be capable of being processed by the Langmuir-Blodgett method. The molecules A and B are dissolved in a common solvent. A few drops of the solution obtained are deposited on the surface of the water in a container for depositing layers according to the Langmuir-Blodgett method. After a period of evaporation of the solvent, the molecules are compressed until a stable and compact film is obtained. This surface film is then transferred and superimposed on the substrate. The second harmonic generating signal generated by a film obtained in this way may be high for a direction of emergence which is perpendicular to the substrate. The results will depend on the molecules used and their respective concentrations.

For example, the active molecule A is shown in FIG. 4. This molecule has already been recently synthesized by the British firm, Imperial Chemical Industries. It comprises a hydrophilic head formed by the group —COOH and a hydrophobic end due to the presence of the group —$C_nH_{2n+1}$. The molecule B may be behenic acid, which is inert in the generation of second harmonics, and is shown in FIG. 5. It may also be another molecule of the fatty acid series such as stearic acid. The solvent used may be chloroform.

The relative proportions of the two types of molecules are especially important for the effectiveness of the film. The graph of FIG. 6 clearly shows the advantage obtained by a correctly determined mixture. This graph shows the development of the second harmonic generating signal S (in (mV) for an exciting wave with a constant amplitude directed towards the film at an angle of incidence of 0°, as a function of the percentage of behenic acid moles in the mixture and for n=12 in the case of the molecule A. The second S was detected with a photomultiplier. The curve of this graph highlights all the importance of the mixture and of the relative proportions of the constituent elements of this mixture. For the pure active product gives a response equal to 10 mV while, for a mixture comprising 40% of behenic acid, the response obtained is equal to 200 mV. This is a remarkable result and may seem to be surprising since the mixture of an active product with an inert product gives far better results than the active product when used alone.

The above example refers to two types of distinct molecules, but it is possible to conceive of Langmuir-Blodgett films made with several active or inert molecules. In the same way, it is possible to conceive of films comprising several layers with all the combinations possible to obtain the structures described in FIGS. 1 to 3.

The film according to the invention may be used in an optical correlator such as the one shown in FIG. 7. This correlator has been prepared with a substrate 5, made of glass for example, with a length l determined according to the characteristics of the correlator. The use of masking techniques and the method for manufacturing optic guides by ion exchange ($Ag^+ \leftrightarrow Na^+$) in an electrical field gives a region 6 with a refractive index greater than that of the substrate. A Langmuir-Blodgett film is then deposited on the upper surface of the substrate shown in FIG. 7. This film has been represented by dots in the figure. The region 6 forms a waveguide. Two optic waves, with a pulsation $\omega$, that enter the waveguide thus created in the manner shown in FIG. 7, can thus generate a second harmonic optic wave radiating in a direction perpendicular to the substrate.

What is claimed is:

1. A Langmuir-Blodgett film comprising at least one layer of amphiphilic molecules deposited on a substrate, wherein these molecules comprise, first molecules being active in nonlinear optics and second molecules capable of remaining inert or being active in nonlinear optics, said first and second molecules being mixed in specified proportions to obtain a film capable of giving out, perpendicular to the substrate, an optic wave which is a second harmonic with respect to an exciting wave.

2. A film according to the claim 1 wherein the second molecule comprise molecules of the fatty acid series.

3. A film according to the claim 2 wherein the second molecule comprise molecules of the behenic acid series.

4. A film according to the claim 2 wherein the second molecule comprise molecules of the stearic acid series.

5. A film according to the claim 1 wherein the second molecule of the first type comprise molecules having the following structure:

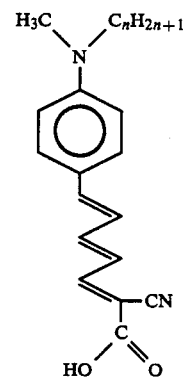

6. A film according to the claim 5 wherein the number n is equal to 12.

* * * * *